United States Patent Office 2,874,150
Patented Feb. 17, 1959

2,874,150

EPOXY COMPOUNDS

Roger M. Christenson, Richland Township, and John J. Jaruzelski, Pittsburgh, Pa., assignors to Pittsburgh Plate Glass Company, Allegheny County, Pa.

No Drawing. Application November 20, 1956
Serial No. 623,305

9 Claims. (Cl. 260—78.4)

This invention relates to epoxy compounds and it has particular relation to aromatic compounds comprising a plurality of epoxyalkoxymethyl groups substituted for hydrogen in the aromatic nucleus.

It has heretofore been disclosed to react an aromatic compound such as benzene or an alkylated benzene such as toluene, xylene, mesitylene, durene or the like with an aldehyde such as formaldehyde in the presence of a hydrogen halide such as hydrogen chloride to form a halomethyl-substituted aromatic hydrocarbon in which the group (—$CH_2$-halogen) replaces one or preferably more of the hydrogens of the aromatic nucleus.

In an application by the inventors filed concurrently with this application and entitled Alkenyloxymethyl Aromatic Compounds, Serial number 623,312, is disclosed a method of forming unsaturated ethers containing >C=$CH_2$ groups and being derivatives obtained by reaction of a halomethyl aromatic compound prepared as above described, with an unsaturated alcohol being of the generalized formula:

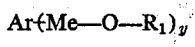

wherein $y$ is a number from 1 to 4, usually 2 or 3, Me represents alkylene, preferably methylene, and $R_1$ is the radical derived by removing an hydroxyl group from an unsaturated alcohol. Ar represents an aromatic or aryl radical such as a single benzene ring containing from 0 to 4 alkyl groups or alkoxyl groups substituted for hydrogen in the benzene ring. Ar may also comprise two benzene rings condensed or fused to form a naphthalene group. Preferred compounds comprise poly(alkenyloxymethyl)aromatic compounds, such as poly(alkenyloxymethyl)xylene containing about 2 to 3 of the alkenyloxymethyl side chains, and possessing the structure:

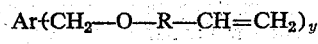

wherein R is an alkylene radical, preferably containing from 1 to 4 carbon atoms. For example, R may be methylene, ethylene, propylene, isopropylene, butylene, isobutylene or even higher groups. Preferably R is methylene. Ar, and $y$ have the significance given hereinabove.

In accordance with this invention, it has been discovered that the foregoing (alkenyloxymethyl)aromatic compounds can be subjected to oxidation under appropriate conditions to form epoxides useful in forming synthetic resins as well as for other purposes. The generalized formula of the novel compounds may be represented as follows:

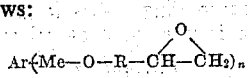

where the symbols Ar, R, and Me have the significance previously attached to them, and $n$ is a whole number from 1 to 4.

While the foregoing sequence of steps involving the introduction of halomethyl groups into the aromatic nucleus followed by reaction with an unsaturated alcohol to form the (alkenyloxymethyl)-aromatic compound and finally oxidation of the latter, constitute a series of steps which can be conducted economically to obtain reasonable yields of the desired epoxy compound, it is to be understood that the invention is not necessarily limited thereto. For example, the present invention contemplates the conversion of the alkenyloxymethyl derivatives of aromatic compounds to epoxy compounds regardless of the source of the alkenyloxymethyl compound. Likewise, the epoxyalkoxymethyl derivatives per se are regarded as being novel, regardless of the method by which they are derived. Such compounds accordingly are regarded as being within the purview of the present invention.

In the preparation of the (epoxyalkyloxymethyl)aromatic compounds of this invention, by the stages previously broadly described, various aromatic compounds may be employed. These include benzene, naphthalene, toluene, xylene, mesitylene and durene or other aromatic compounds comprising a single or a condensed benzene ring and having not more than 4 of the hydrogens replaced by alkyl groups or oxyalkyl groups. These preferably are reacted with formaldehyde and a halogen halide in the manner already briefly described to form halomethyl-substituted benzenes or the alkyl derivatives thereof.

The preparation of a halomethyl-substituted aromatic compound suitable for use in the practice of the present invention employing the stages previously described is illustrated by the preparation of bis-(chloromethyl)xylene as disclosed in copending application Serial number 580,717 to John J. Jaruzelski. In accordance with the method of said application, a mixture is prepared comprising:

| | Parts by weight |
|---|---|
| m-Xylene | 848 |
| Formaldehyde (37 percent aqueous solution) | 1,740–1,800 |
| Zinc chloride (catalyst) | 40 |

The foregoing mixture is heated at 90° C. to 95° C. for 18 hours while hydrogen chloride gas is bubbled therethrough. The reaction mixture is cooled and a white solid is crystallized out, filtered, washed with water, dried and crystallized from heptane to yield 869 parts by weight of 4,6-bis-(chloromethyl)-m-xylene melting in a range of 93° C. to 96° C. This product is suitable for use as a starting material in the preparation of 4,6-bis-(2,3-epoxypropoxymethyl)-m-xylene, a typical member of the famliy of epoxy compounds contemplated by the present invention.

It is to be understood that the m-xylene in the foregoing example may be replaced by the other xylenes comprising p-xylene, as well as by mesitylene, durene, toluene, benzene as well as 1-methyl naphthalene or the like.

In order to convert the chloromethyl-xylene into a bis-(alkenyloxymethyl)xylene in the second stage of the process, a charge is prepared comprising 81 grams (2 moles) of sodium hydroxide in 1,200 milliliters of anhydrous allyl alcohol. The mixture is heated to refluxing temperature in an appropriate flask having a reflux condenser and an agitator. To the mixture is added a hot slurry of 200 grams (0.98 mole) of bis-(chloromethyl)-m-xylene in 200 milliliters of allyl alcohol. The mixture is stirred and refluxed for 4 hours. During this time, a heavy precipitate of sodium chloride is separated. At the conclusion of the reaction, the sodium chloride is removed by filtration and the filtrate is stripped of excess allyl alcohol. The latter may be recovered for reuse in the process or for use in other appropriate applications.

The resulting solution comprising the 4,6-bis-(allyloxymethyl)-m-xylene may be fractionally distilled to produce a cut comprising 198 grams (a yield of about 82 percent) of a product of a boiling point of 130° C.–133°. C. at 0.5 millimeter of pressure (absolute). The refractive index is $n_D^{23}=1.5145$. The density is 0.9785 gram per cubic centimeter. The iodine value is 205 as against a calculated iodine value of 206.5.

The product consists of bis-(allyloxymethyl)xylenes of the formula:

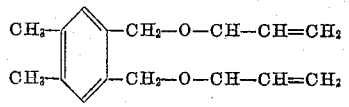

Where the starting aromatic compound is m-xylene as in the present case, the predominant product is 4,6-bis-(allyloxymethyl)-m-xylene which is adapted to be oxidized under the provisions of the present invention to form a 4,6-bis-(2,3-epoxypropoxymethyl)-m-xylene.

In conducting the conversion of the bis-(allyloxymethyl)-xylene, such as 4,6-bis-(allyloxymethyl)-m-xylene, into the corresponding epoxy compound, oxidation may be effected with peracetic acid preferably dissolved in a solvent such as acetic acid, or with an inert solvent such as an aromatic compound, e. g. benzene or toluene, or an ether such as diethyl ether. The invention includes the use of other oxidizing agents than peracetic acid adapted to convert the terminal >C=CH₂ groups into epoxide groups. Some of the agents which may be used to convert the olefin group into the epoxide comprise organic peracids such as:

Peracetic acid
Performic acid
Perbenzoic acid
Monoperphthalic acid
Perpelargonic acid
Perpropionic acid
Pertrifluoric acid Other methods of oxidation, for example, with hydrogen peroxide, are included.

Ideally, the reaction may be represented approximately as follows:

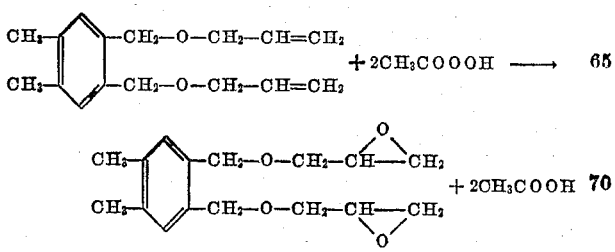

Probably there is also some competitive tendency of the terminal epoxy groups to react with acetic acid generated in the mixture to form a terminal ester group. This reaction may be represented by the equation:

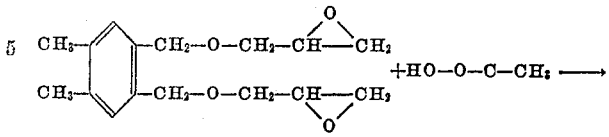

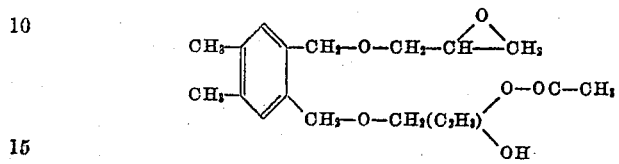

Possibly some of the diester of the formula:

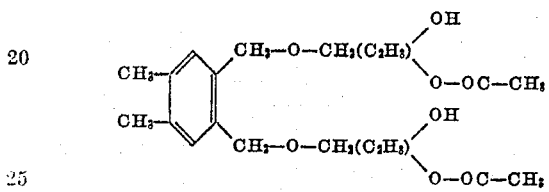

is also formed.

The overall reaction may therefore be represented by the equation:

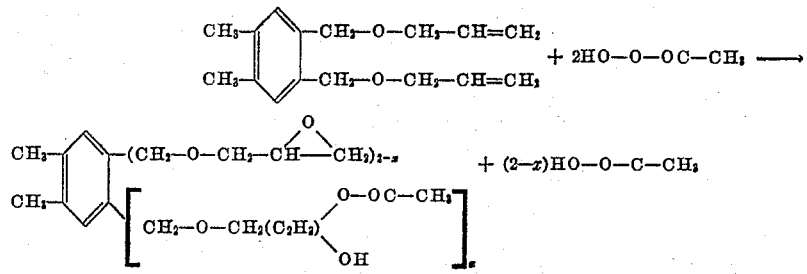

The symbol $x$ will not exceed 2 in this equation. Usually the reaction is controlled to maintain $x$ below 1, e. g. not above 0.1 to 0.9. The oxidation may also result in the formation of some hydroxyl and ester groups replacing a part of the epoxy groups.

The mixtures can be used without separation into components or they can be separated by vacuum distillation or other methods into components rich in the several compounds.

The amount of oxidizing agent may be varied. Usually at least about a molecular equivalency is employed, but this amount may be increased, if desired, to 200 or even 300 percent of the theoretical amount. Naturally, excessive amounts tend to increase costs of the reaction.

The reaction temperature may vary over a relatively broad range, e. g. in a range of 0° C. to 100° C., and preferably from 0° C. to 75° C. At lower temperatures, the reaction tends to be slow, while higher temperatures greatly speed the reaction, but tend to promote side reactions. Therefore, excessive temperatures are not preferred.

The conversion of 4,6-bis-(allyloxymethyl)-m-xylene into the corresponding 4,6-bis-(2,3-epoxypropoxymethyl)-m-xylene is illustrated as follows:

*Example I*

A three-necked flask equipped with a condenser, dropping funnel, a mechanical stirrer, a thermometer and a heating device is charged with 123 grams (0.50 mole) of 4,6-bis-(allyloxymethyl)-m-xylene prepared in the manner previously described and is heated to 68° C. A 40 percent solution of peracetic acid (1.04 moles) in acetic acid is added to the flask through the dropping funnel over a period of approximately 1 hour. If desired, the peracetic acid solution may comprise a buffer of reaction such as sodium acetate. This may be used in an amount of about 6 grams. The temperature is kept at 98° C. plus or minus 1 degree by immersing the reactor from time to time in a cold water bath. When the addition is completed, the entire reaction mixture is poured into cold water. The layers separate and the organic layer is diluted with ether. The ether solution is washed with water and then with an aqueous solution of sodium bicarbonate followed by a second water washing. The product is dried over calcium chloride. Subsequently, the ether is distilled under vacuum and the product is mixed with Celite and filtered. A yellow oily material in an amount of 108 grams (78 percent) is obtained, and comprises 4,6-bis-(2,3-epoxypropoxymethyl)-m-xylene. This material has a density at 24° C. of 1.106 grams per cubic centimeter and the refractive index is $n_D^{25}=1.5203$. The epoxide value is 223.7.

In a further example, a series of samples of 4,6-bis-(2,3-epoxypropoxymethyl)-m-xylene is prepared under different reaction conditions. The apparatus is the same as, or substantially the same as that already described. In each instance, 4,6-bis-(2,3-allyloxymethyl)-m-xylene prepared as previously described, is employed in an amount of 0.5 mole. Peracetic acid in an amount of 1.4 moles and at a concentration of 40 percent in acetic acid is employed as the oxidizing agent. In each instance, 6 grams of sodium acetate is employed to buffer the reaction.

The times of reaction, the times for addition of the peracetic acid, the temperature based upon starting 4,6-bis-(allyloxymethyl)-m-xylene used and the yields in percent based upon an epoxide value of 100 percent of the theoretical epoxide equivalent, and saponification numbers are:

| Time in minutes, reaction time | Addition time for peracetic acid Soln., minutes | Temp. in °C.±1° | Yield in percent | Yield percent epoxide 100% | Analysis | |
|---|---|---|---|---|---|---|
| | | | | | Expoxide equiv. | Saponification number |
| 240 | 60 | 50 | 72.6 | 48.1 | 209.7 | 51.5 |
| 240 | 65 | 50-55 | 64.5 | 36.2 | 246.5 | 51.6 |
| 90 | 70 | 65 | 49.5 | 28.0 | 247.5 | 83.8 |
| 30 | | 70 | | | | |
| 90 | 60 | 65 | 64.0 | 34.8 | 255.8 | 88.7 |
| 30 | | 70 | | | | |
| 240 | 60 | 35 | 69.0 | 44.0 | 218.9 | 10.1 |
| 360 | 60 | 2 | 79.7 | 6.3 | 1,741.9 | 10.6 |
| 360 | 60 | 68 | 25.5 | 5.6 | 629.2 | 125.4 |
| 240 | 60 | 2 | 80.2 | 4.7 | 2,353.4 | 7.3 |
| 120 | 60 | 2 | 79.0 | 3.0 | 3,718.9 | 6.9 |
| 120 | 60 | 35 | 71.0 | 34.6 | 385.1 | 6.9 |
| 240 | 60 | 68 | 35.4 | 11.7 | 420.5 | 113.9 |
| 360 | 60 | 35 | 66.0 | 43.6 | 211.4 | 14.2 |
| 120 | 60 | 68 | 48.7 | 25.2 | 266.9 | 76.1 |
| 300 | 60 | 30 | 79.5 | 45.3 | 243.5 | 12.6 |
| | 60 | 68 | 78.8 | 49.0 | 223.7 | 17.6 |
| 300 | 50 | 35 | 82.5 | 51.7 | 221.6 | 12.8 |
| 120 | 25 | 57 | 73.5 | 50.9 | 200.6 | 37.3 |
| | 30 | 68 | 78.1 | 52.6 | 206.9 | 10.1 |
| | 60 | 68 | 75.3 | 54.4 | 193.4 | 39.3 |
| | 25 | 68 | 81.3 | 52.6 | 215.0 | 14.3 |
| 15 | 60 | 68 | 68.4 | 49.2 | 193.4 | 52.8 |

In each instance, 4,6-bis-(2,3-epoxypropoxymethyl)-m-xylene was obtained in useful amount and with or without esterification could be used for various purposes, as for example in the preparation of a resin coating medium.

*Example II*

In a still further example, 0.5 mole of 4,6-bis-(allyloxymethyl)-m-xylene was reacted with 282.5 grams of 40 percent peracetic acid solution in acetic acid as a solvent containing 9 grams of sodium acetate. The mixture was added over 30 minutes to the 4,6-bis-(allyloxymethyl)-m-xylene and was reacted at 68° C. to obtain a yield of 78.1 percent of product which upon the basis of 100 percent epoxide, comprises a yield of 52.6 percent. This material had an epoxide equivalent of 206.9 and a saponification value of 16.1. The material comprised largely 4,6-bis-(2,3-epoxypropoxymethyl)-m-xylene useful for various purposes.

The 4,6-bis-(2,3-epoxypropoxymethyl)-m-xylene of this invention is susceptible of various uses. For example, it is a valuable starting material in the preparation of epoxy resins. It also can be cured with curing agents used presently to cure the conventional types of epoxy resins derived from p,p'-isopropylidene-diphenol and epichlorohydrin.

The use of the material in forming a coating is illustrated as follows. A reaction mixture is made to comprise:

| | Grams |
|---|---|
| 4,6-bis-(2,3-epoxypropoxymethyl)-m-xylene | 5 |
| Tetraethylene pentamine | 1 |
| Soluble urea-foraldehyde resin | 0.12 |

The mixture is spread upon a steel plate giving a film which is baked at 300° F. for five minutes. The film has good adhesion to steel or glass, mar resistance, Sward hardness of 32 and an impact resistance of 40 pounds/inch. The composition is a good coating material for steel, glass and other materials.

*Example III*

In a still further application, the polyamine (tetraethylene pentamine) of the above example is replaced by a commercial material sold by the General Mills Corporation as Versamid-115. This is understood to be a polyamide of dilinoleic acid (as a dimer acid) and ethylene diamine, with possibly other amines such as polyfunctional amines included. The coating composition comprises:

| | Grams |
|---|---|
| 4,6-bis-(2,3-epoxypropoxymethyl)-m-xylene as above described | 15 |
| Versamid-115 | 15 |

The mixture is spread as a film upon a suitable non-adhesive surface and permitted to stand for 2 hours at room temperature (about 77° F.) and is then cured at 250° F. for 100 minutes to provide a sheet of about 0.175 inch thickness. This sheet is a flexible plastic and has an ultimate strength of 246 p. s. i. and an elongation at break of 60 percent. The material while liquid, may be spread as a coating medium and cured to solid, adherent state.

*Example IV*

In a further formulation, polyvinyl chloride is incorporated into a mixture comprising 4,6-bis-(2,3-epoxypropoxymethyl)-m-xylene and tetraethylene pentamine. The formulation is as follows:

| | Grams |
|---|---|
| 4,6-bis-(2,3-epoxypropoxymethyl)-m-xylene | 6 |
| Tetraethylene pentamine | 0.3 |
| Polyvinyl chloride | 8 |

The components are thoroughly mixed and are spread as a film upon a steel plate. The plate is baked for 20 minutes at 175° F. and for 5 minutes at 350° F. The film has a Sward hardness of 20, an impact value of 20 pounds/inch and it displays good adhesion and successfully withstands soaking in water for 3 hours.

If desired, the bis-(epoxyalkoxymethyl)aromatic compounds of this invention as represented by 4,6-bis-(2,3-epoxypropoxymethyl)-m-xylene may be reacted with polyhydric phenols represented by p,p'-isopropylidene diphenol already referred to as Bisphenol A. The reaction corresponds to the reaction of the epoxy group with polyhydric phenols in the conventional preparation of epoxy resins. The two epoxy groups of the bis-(epoxyalkoxymethyl)aryl compound provide two functional groups adapting the material to react with the polyhydric phenol to form long chain polymers.

The bis-(epoxyalkoxymethyl)aryl compounds of this invention as represented by 4,6-bis-(2,3-epoxypropoxymethyl)-m-xylene may, as already stated, also include certain amounts of hydroxyl groups in terminal position. These can be reacted with isocyanates and notably tolylene diisocyanate, thus imparting to the molecules terminal epoxide groups as represented by the equation:

Example VII

A mixture is prepared comprising 85 percent by weight of 4,6-bis-(2,3-epoxypropoxymethyl)-m-xylene and 15 percent by weight of tolylene diisocyanate. This mixture is heated in a container at 212° F. for 1 hour. A

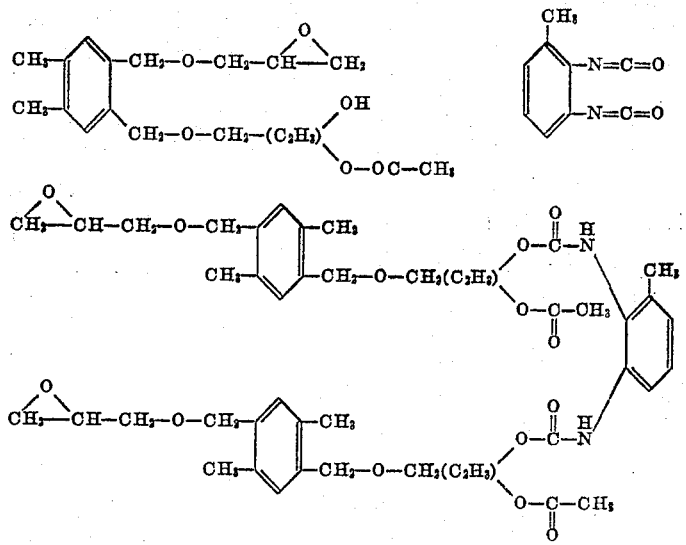

Bis-(epoxypropoxymethyl)xylenes, such as 4,6-bis-(2,3-epoxypropoxymethyl)-m-xylenes, may also be interpolymerized with dicarboxylic acids and their anhydrides to form valuable resins useful in coating films and for other purposes. The following example illustrates such interpolymerization.

Example V

The reaction mixture comprises:

| | Parts by weight |
|---|---|
| 4,6-bis-(2,3-epoxypropoxymethyl)-m-xylene | 2.1 |
| Chlorendic acid anhydride | 3.7 |

The mixture is heated for 40 minutes at 325° F. to form a yellow resin, films of which have a Barcol of 28. This resin contains large amounts of chlorine, a good fire retardant. The chlorine also greatly increases the molecular weight.

The anhydride of chlorendic acid could be replaced by endomethyl Δ4-tetrahydrophthalic anhydride, or by phthalic anhydride, pyromellitic anhydride, or adipic acid, or the like.

Usually the dicarboxylic acids or their anhydrides will be employed in approximate equivalency of the available epoxy groups.

The following examples illustrate the use of the 4,6-bis-(2,3-epoxypropoxymethyl)-m-xylene as an interpolymer with tolylene diisocyanate to form valuable coating films.

Example VI

In accordance with this example, a mixture is prepared comprising:

| | Grams |
|---|---|
| 4,6-bis-(2,3-epoxypropoxymethyl)-m-xylene | 265 |
| Tolylene diisocyanate | 16.5 |

This mixture is heated in a container to 212° F. for 1 hour to obtain a product having a viscosity of F. A 10 gram sample of this material is then mixed with 2 grams of tetraethylene pentamine (catalyst) and a portion of the material is employed to coat bare steel test panels while a second portion is introduced into a test tube. The material upon the steel when baked at 300° F. for five minutes, is cured to a hard, adherent film. The portion in the test tube cures at room temperature over a period of two days to a hard, transparent state indicating that the material is useful as a casting medium.

5 gram sample of this mixture is mixed with 1 gram of diethylenetriamine and steel test panels are coated therewith. The test panels are cured for 15 minutes at 300° F. whereby to obtain films of a Sward hardness of 62 and further having good adhesion to the steel substrate.

Another steel panel coated with the same material is allowed to cure at room temperature for a period of 18 hours. The resultant coating is hard and strongly adherent to the metal. The interpolymers of the 4,6-bis-(2,3-epoxypropoxymethyl)-m-xylene and tolylene diisocyanate are useful coating media and are also useful as casting resins.

The forms of the invention as herein described are to be considered as being by way of example; it will be manifest to those skilled in the art that numerous modifications may be made therein without departure from the spirit of the invention or the scope of the appended claims.

We claim:

1. An epoxide of the formula:

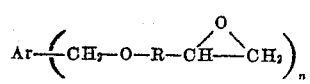

wherein Ar is a benzene ring containing 0 to 4 alkyl groups as side chains, R is an alkylene radical of 1 to 4 carbon atoms and $n$ is a number from 1 to 4.

2. An epoxide of the formula:

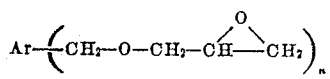

where Ar is a benzene ring containing from 0 to 4 alkyl groups having 1 to 4 carbon atoms, as side chains and $n$ is a number from 1 to 4.

3. As a new compound a bis-(epoxypropoxymethyl)-xylene.

4. As a new compound xylene containing 1 to 4 epoxypropoxymethyl side chains substituted for ring hydrogen.

5. A new material consisting of a benzene hydrocarbon ring containing 0 to 4 methyl side chains and 1 to 4 epoxypropoxymethyl side chains substituted for hydrogen in the ring.

6. A new material of the formula:

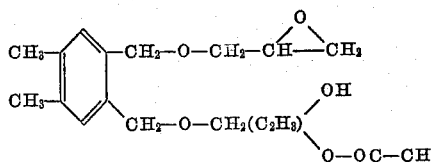

7. As a new compound 4,6-bis-(2,3-epoxypropoxymethyl)-m-xylene.

8. The method of curing a 4,6-bis-(2,3-epoxypropoxymethyl)-m-xylene which comprises incorporating the anhydride of a dicarboxylic acid therewith and heating the mixture.

9. The method of forming an epoxy compound consisting essentially of a benzene ring with 0 to 4 methyl groups and 1 to 4 epoxypropoxymethyl groups as side chains, which comprises reacting a compound consisting essentially of a benzene ring having 0 to 4 methyl groups and 1 to 4 groups of the structure

substituted for hydrogen, with about 1 to 3 equivalents of an organic peroxidic acid and at a temperature extending from about 0° C. to about 100° C. until said epoxy compound is formed.

No references cited.

UNITED STATES PATENT OFFICE
Certificate of Correction

Patent No. 2,874,150                            February 17, 1959

Roger M. Christenson et al.

It is hereby certified that error appears in the printed specification of the above numbered patent requiring correction and that the said Letters Patent should read as corrected below.

Column 3, lines 12 to 15, the formula should appear as shown below instead of as in the patent:

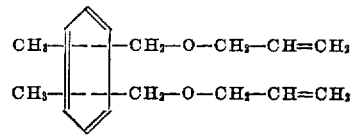

same column 3, lines 63 to 73, the formula should appear as shown below instead of as in the patent:

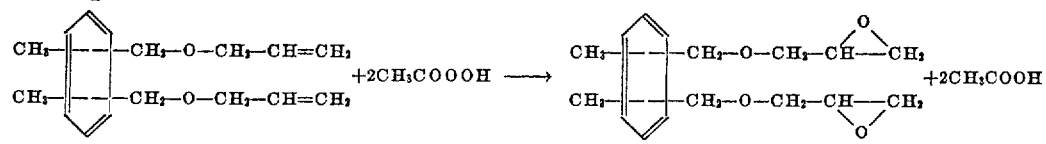

column 4, lines 4 to 15, the formula should appear as shown below instead of as in the patent:

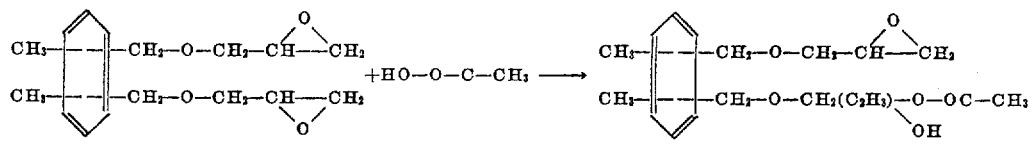

same column 4, lines 19 to 25, the formula should appear as shown below instead of as in the patent:

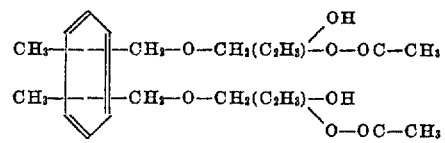

same column 4, lines 30 to 42, the formula should appear as shown below instead of as in the patent:

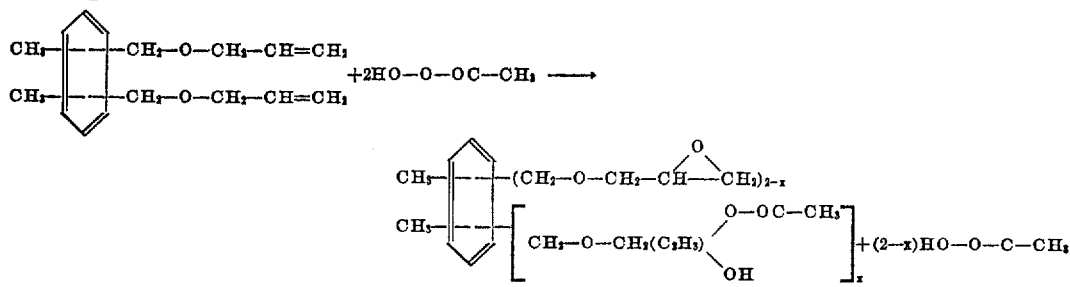

column 5, line 20, for $n_D^{25}$      read      $n\frac{25}{D}$ column 6, line 18, for "urea-foraldehyde" read —urea-formaldehyde—; column 7, lines 7 to 29, the formula should appear as shown below instead of as in the patent:

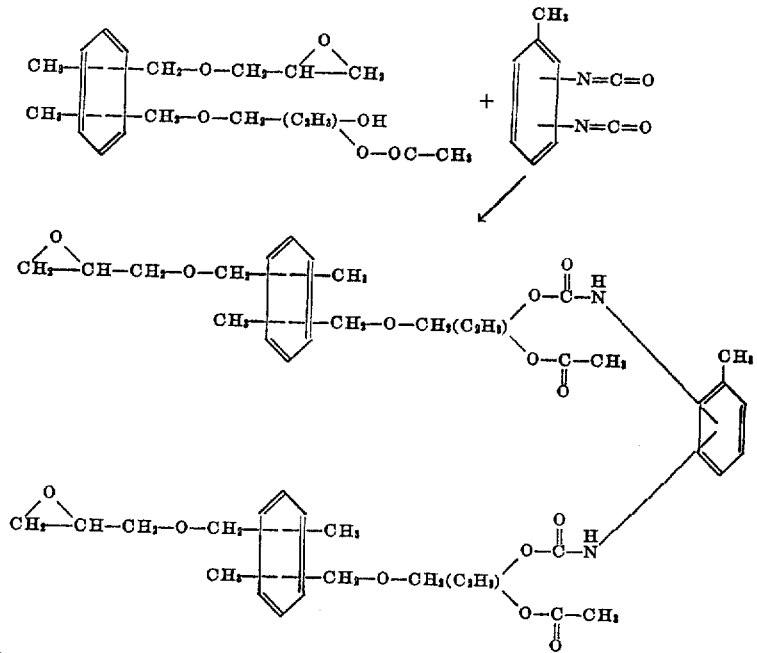

column 9, lines 2 to 9, the formula should appear as shown below instead of as in the patent:

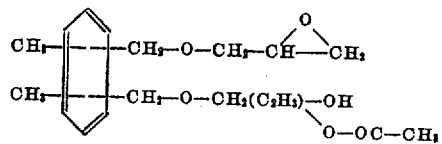

Signed and sealed this 30th day of August 1960.

[SEAL]

Attest:
ERNEST W. SWIDER,
*Attesting Officer.*

ROBERT C. WATSON,
*Commissioner of Patents.*